United States Patent
Cattaneo

(10) Patent No.: US 10,724,216 B2
(45) Date of Patent: Jul. 28, 2020

(54) DEVIATOR DEVICE AND PROGRESSIVE CARTRIDGE, PARTICULARLY FOR BATHROOM FITTINGS SUCH AS SHOWERS, BATHS AND THE LIKE

(71) Applicant: Piero Cattaneo, Cavaglio d'Agogna (IT)

(72) Inventor: Piero Cattaneo, Cavaglio d'Agogna (IT)

(*) Notice: Subject to any disclaimer, the term of this patent is extended or adjusted under 35 U.S.C. 154(b) by 0 days.

(21) Appl. No.: 15/793,532

(22) Filed: Oct. 25, 2017

(65) Prior Publication Data
US 2018/0112378 A1 Apr. 26, 2018

(30) Foreign Application Priority Data
Oct. 25, 2016 (IT) .................. 102016000107535

(51) Int. Cl.
E03C 1/04 (2006.01)
F16K 27/04 (2006.01)
F16K 31/60 (2006.01)

(52) U.S. Cl.
CPC .......... *E03C 1/0403* (2013.01); *E03C 1/041* (2013.01); *F16K 27/044* (2013.01); *F16K 31/605* (2013.01)

(58) Field of Classification Search
CPC .. E03C 1/0403; E03C 1/0404; F16K 11/0445; F16K 11/0743; F16K 11/085; F16K 11/0853; F16K 3/04; F16K 3/08; Y10T 137/0502; Y10T 137/0508
USPC ....... 137/625.17, 625.41, 801; 239/398, 407, 239/417.5
See application file for complete search history.

(56) References Cited

U.S. PATENT DOCUMENTS

| 6,920,899 B2* | 7/2005 | Haenlein | F16K 11/0746 |
| | | | 137/625.17 |
| 6,966,335 B2* | 11/2005 | Chen | F16K 11/0782 |
| | | | 137/625.17 |
| 8,327,882 B2* | 12/2012 | Li | F16K 11/0787 |
| | | | 137/625.4 |
| 8,863,778 B2* | 10/2014 | Chen | F16K 11/02 |
| | | | 137/625.41 |

(Continued)

FOREIGN PATENT DOCUMENTS

| EP | 0112777 | * 7/1984 | ............ F16K 11/078 |
| EP | 0112777 A1 | 7/1984 | |

(Continued)

OTHER PUBLICATIONS

Italian Patent Office Search Report and Written Opinion dated Jun. 15, 2017 (partially in English).

*Primary Examiner* — David P Angwin
*Assistant Examiner* — Nicholas A Ros
(74) *Attorney, Agent, or Firm* — Hedman & Costigan, P.C.; James V. Costigan; Kathleen A. Costigan

(57) ABSTRACT

A deviator device, particularly for bathroom fittings such as showers, baths and the like, comprising a control rod rotatably movable in a support associated to a mixing cartridge; said control rod has at least two supply positions in which the mixed water flow is directed to one or another of two or more separate lines corresponding to two or more separate users; said rod is integral with a rod support and turns in the cover and further comprises a closing position; said deviator device being characterized in that said movement is guided and is obtained by fixed paths of pegs in slots.

9 Claims, 4 Drawing Sheets

(56) References Cited

U.S. PATENT DOCUMENTS

| | | | | |
|---|---|---|---|---|
| 9,777,469 B2 * | 10/2017 | Wang | .................... | E03C 1/0412 |
| 2004/0099319 A1 * | 5/2004 | Monti | ....................... | B67C 3/28 |
| | | | | 137/625.46 |
| 2005/0229983 A1 * | 10/2005 | Chen | ................... | F16K 11/0787 |
| | | | | 137/625.17 |
| 2006/0174955 A1 * | 8/2006 | Huang | ................ | F16K 11/0785 |
| | | | | 137/625.17 |
| 2016/0305101 A1 * | 10/2016 | Liu | .................... | F16K 11/0787 |
| 2019/0178413 A1 * | 6/2019 | Chen | ....................... | F16K 35/04 |

FOREIGN PATENT DOCUMENTS

| | | |
|---|---|---|
| EP | 0855544 A2 | 7/1998 |
| EP | 0855544 A3 | 12/1998 |
| EP | 1020671 A2 | 7/2000 |
| EP | 1020671 A3 | 5/2001 |
| EP | 2317193 A1 | 5/2011 |
| IT | 1110824 B | 1/1986 |

* cited by examiner

DEVIATOR DEVICE AND PROGRESSIVE CARTRIDGE, PARTICULARLY FOR BATHROOM FITTINGS SUCH AS SHOWERS, BATHS AND THE LIKE

BACKGROUND OF INVENTION

The present invention relates to a deviator device, particularly for bathroom fittings such as showers, baths and the like.

As is known, a deviator is a mechanism with the function of deviating a hydraulic flow, water in the case in point, coming from an inlet, to two or more directions.

In bathroom taps and fittings, the case of a tap for filling a bath and fitted with a flexible shower head is typical; a knob to pull or press, usually on the top of the spout, provides for sending water where required, to the shower head or the spout, while temporarily excluding the other outlet.

This device does not have the function of closing the water flow, because this task is performed by the main, single lever cartridge or screw knob, cut-off valve.

Instead, in installations where closing the water cannot be performed by the main mechanism, a typical example being the simple thermostatic mixer, the deviator must also perform this task.

There are thus mechanisms that deviate water to two or more outlets, in multifunction showers for example, and also close the water flow, allowing choking as well.

Such mechanisms operate with an alternating or, more often, a rotary movement.

The alternating movement allows smoother operation and therefore better manoeuvrability, especially with wet hands.

The rotary movement, still preferred for aesthetic and design reasons, has, however, the drawback of worse manoeuvrability with wet hands, which with the inevitable wear becomes more noticeable over time.

These are mechanisms designed and manufactured for this sole purpose and with high costs.

To be sure of the closing position, small mechanisms are inserted in the rotary deviator that are designed to produce a slight snap in the closing position: fingers, spheres or wedges pushed by a spring, or equivalent devices providing a load.

Given the reduced space available, this always involves small parts that are difficult to assemble.

SUMMARY OF INVENTION

The aim of the present invention is to provide a deviator device that allows at least partially to solve the aforementioned problems.

Within the scope of this aim, one object of the invention is to provide a rotary movement deviator device equipped with closing derived from a traditional mixing cartridge or joystick, but substantially modified so as to achieve savings in parts and assembly equipment.

Another object is to provide a constructively simple and reliable deviator device.

A further object of the invention is to provide a device with optimal manoeuvrability and intuitive operation.

Another object of the present invention is to provide a deviator device in which the movable disc of the cartridge has a completely different movement from the rotary motion usually employed for these applications.

A further object of the invention is to provide a device that has an innovative kinematic mechanism according to which the rotary movement of the rod can arrive up to 180° to enable improved sensitivity and, at the same time, reduce the operating force.

Another object of the present invention is to provide a device that, due to its unique constructional characteristics, is capable of ensuring the broadest guarantees of reliability and safety in use.

These and other objects, which shall be described in greater detail hereinafter, are achieved by a deviator device, especially for bathroom fittings such as showers, baths and the like, comprising a control rod rotatably movable in a support associated with a mixing cartridge; said control rod having at least two supply positions in which the mixed water flow is directed to one or another of two or more separate lines corresponding to two or more separate users; said rod is integral with the rod support and spins in the cover, and further comprises a closing position; said deviator device being characterized in that said movement is driven and is obtained by fixed paths of pegs within slots.

The movement of the movable disc is obtained via a dragging device equipped with pegs and slots and forced to move along a fixed path obtained through tracks formed in the bottom face of the rod support.

BRIEF DESCRIPTION OF THE DRAWINGS

Further characteristics and advantages of the present invention will become more apparent through examination of the description of a preferred, but not exclusive, embodiment of the invention, shown by way of non-limitative example in the accompanying drawings, in which.

DESCRIPTION OF PREFERRED EMBODIMENTS

Figure 1:
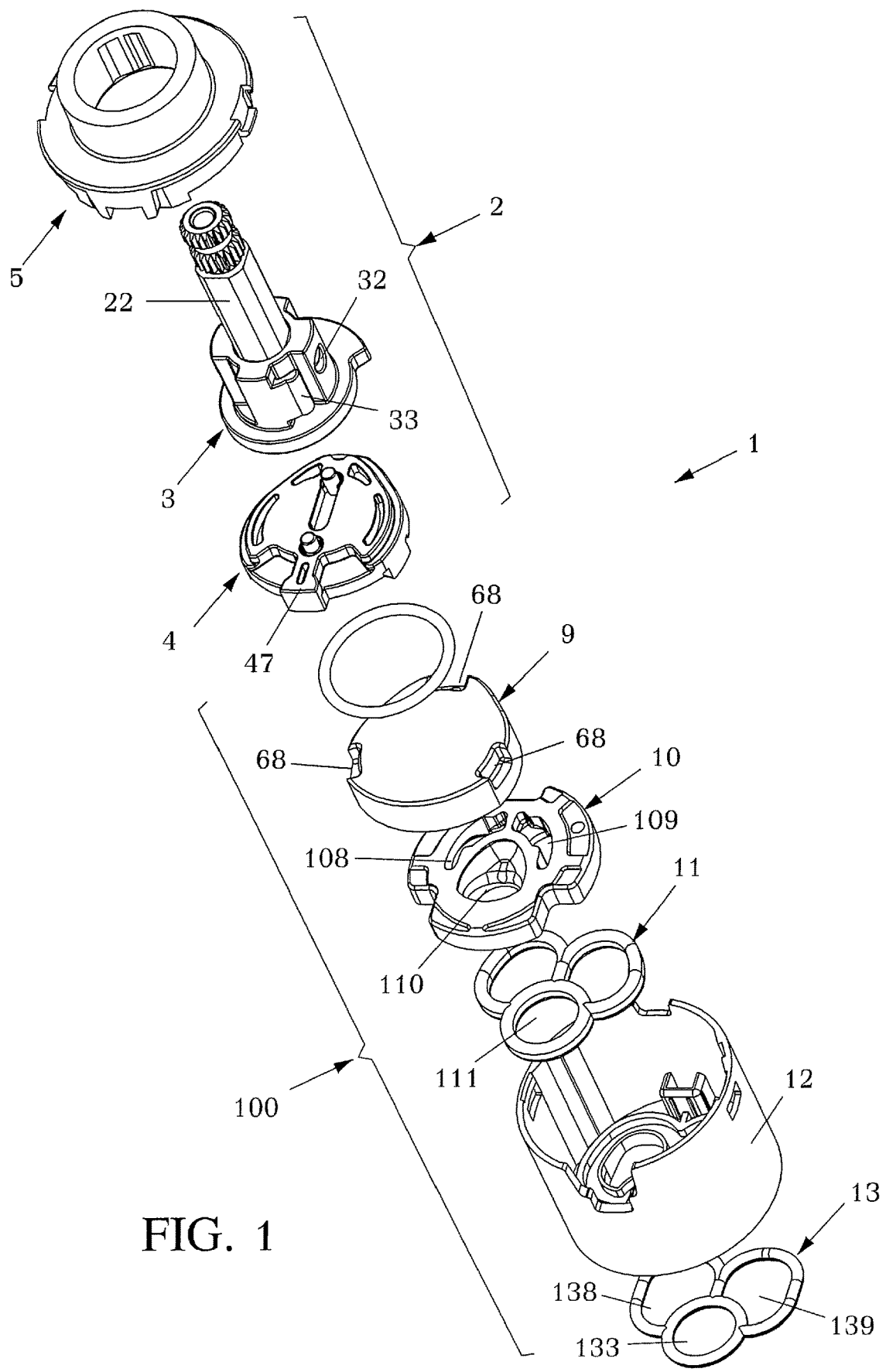
FIG. 1 is an exploded axonometric view of the deviator device, according to the present invention.
Figure 2:
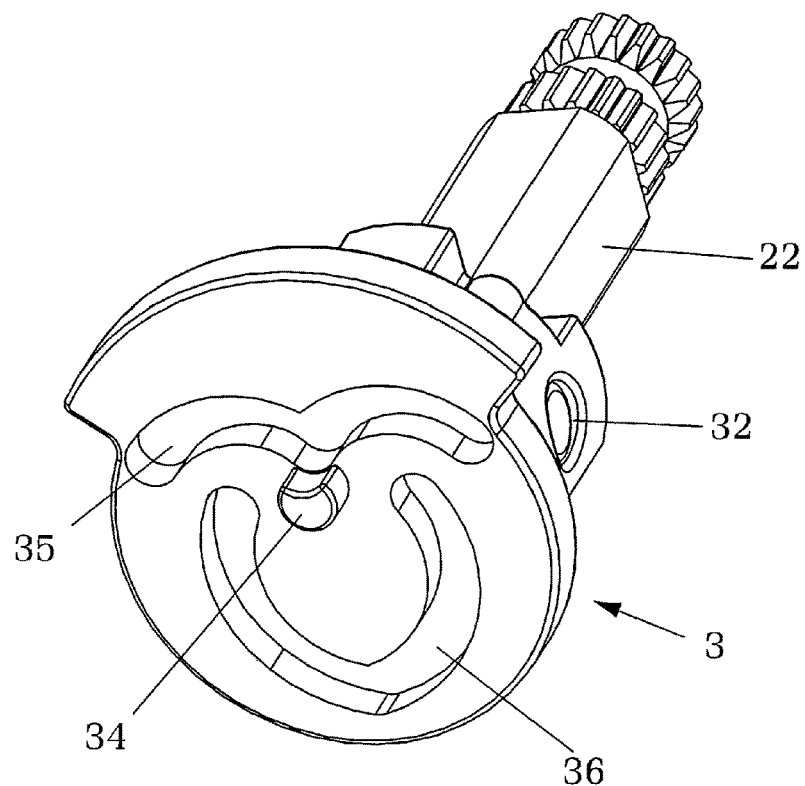
FIG. 2 is an axonometric view from below, showing the rod support and the control rod.
Figure 3:
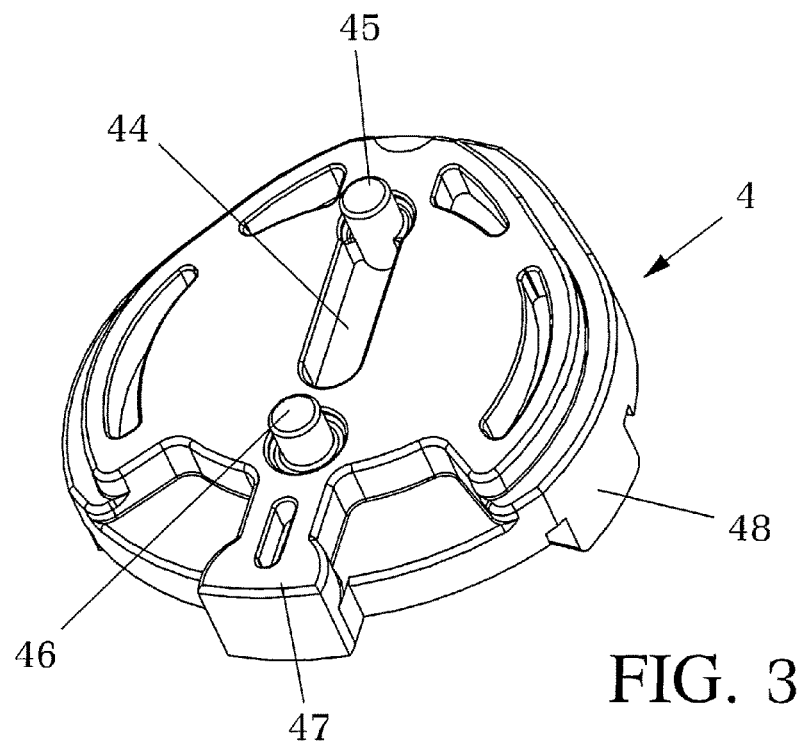
FIG. 3 is an axonometric view from above, showing the dragging device, which is integral with the moving plate.
Figure 4:
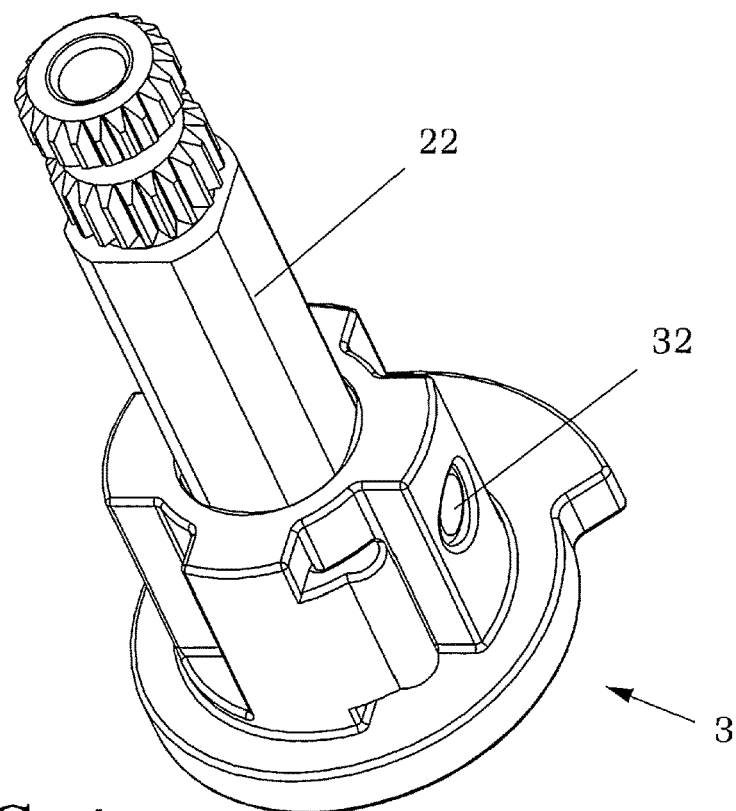
FIG. 4 is an axonometric view from above of the rod support and the control rod.
Figure 5:
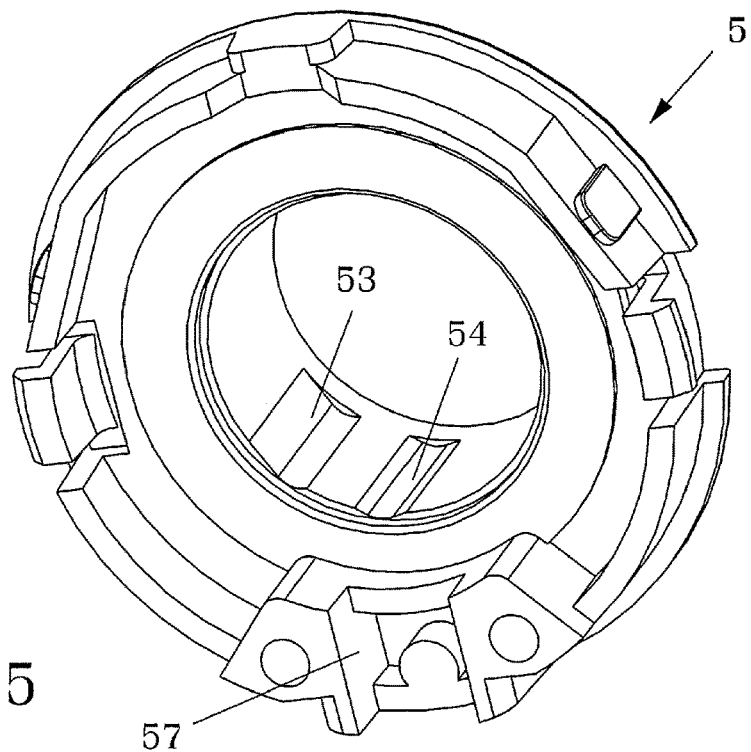
FIG. 5 is an axonometric view showing the cover inside which the rod support turns.

With particular reference to the numeric symbols in the aforementioned figures, the deviator device according to the invention, indicated as a whole by reference numeral 1, comprises a control, indicated as a whole by reference numeral 2, applied to the body of a mixing cartridge 100.

The control 2 is made by replacing the rod of the cartridge and the parts, usually made of plastic, that contain the rod of a common mixing cartridge with a joystick movement.

The cartridge 100 can be specially made or more expediently derived from a traditional cartridge.

According to the present invention, the control 2 comprises a rod support 3, which holds a control rod 22, and is located between a dragging device 4 and a cover 5.

The control 2 is applied to a cartridge body 100 into which water enters from a hole 133 of the seal 13 on the bottom, flows through the container 12 of the cartridge, a hole 111 of the inner seal 11, a hole 110 of a fixed plate 10, and, via a blind cavity of the plate 9, flows out, according to the selection, through either a slot 108 or through a slot 109 of the plate 10, then returning to the bottom of the tap body through outlets 138 or 139 of the seal 13.

According to the present invention, the dragging device 4 of the control 2 comprises a projection 47 slidable in a groove 57 of the cover 5, while the two pegs 45 and 46 of the dragging device 4 are constrained to respectively move in slots 35 and 36 of the rod support 3, along predetermined paths.

At the same time, a third peg 34 of the rod support 3 is also free to move along a slot 44 of the dragging device 4, adding the last constraint required by the system.

The dragging device 4, through one or more projections 48, is integral with the plate 9 of the cartridge body, engaging in suitable seats 68 formed in the plate.

The rod support 3 is connected to the control rod 22 by a pin 32 and is equipped with one or more elastic tongues 33, of suitable shape and length, intended to engage a groove 53 formed in the cover 5 and, with suitable bending during the rotation, to produce a light snap so that the central closing position can be perceived.

A second groove 54 in the cover 5 may also be present to signal a condition of reduced supply (water saving function) to the user of the tap.

In the case of two or more tongues, there can be a corresponding number of primary grooves (to signal the closing position) and/or secondary grooves (to signal the water saving position).

The elastic tongues thus provided allow to produce a snap in a decidedly less expensive manner compared to traditional solutions with springs and spheres or wedges.

This type of kinematic mechanism, with pegs guided in specially provided slots in one or more parts, enables forcing different types of movement on the moving plate and, as a consequence, to provide, in addition to the present deviator, other devices used in taps and fittings such as, but not limited to, a progressive cartridge as described below.

This is a mixing cartridge with opening/closing implemented with only a rotary movement and which passes, turning in the clockwise direction, from the closing position to the maximum supply position of totally cold water and then, mixing the water always at maximum supply, up to the position of totally hot water.

This type of cartridge, present on the market for many years, is made with parts designed and constructed exclusively for this purpose.

With the kinematic mechanism of the present invention, it is still possible to use nearly all the parts of a standard cartridge, by replacing only the rod support 103 and the dragging device 104.

Thanks to the principle of the mechanism applicable to the deviator of the present invention, it is possible to produce some variants that enable the necessary movement for this cartridge.

Figure 6:
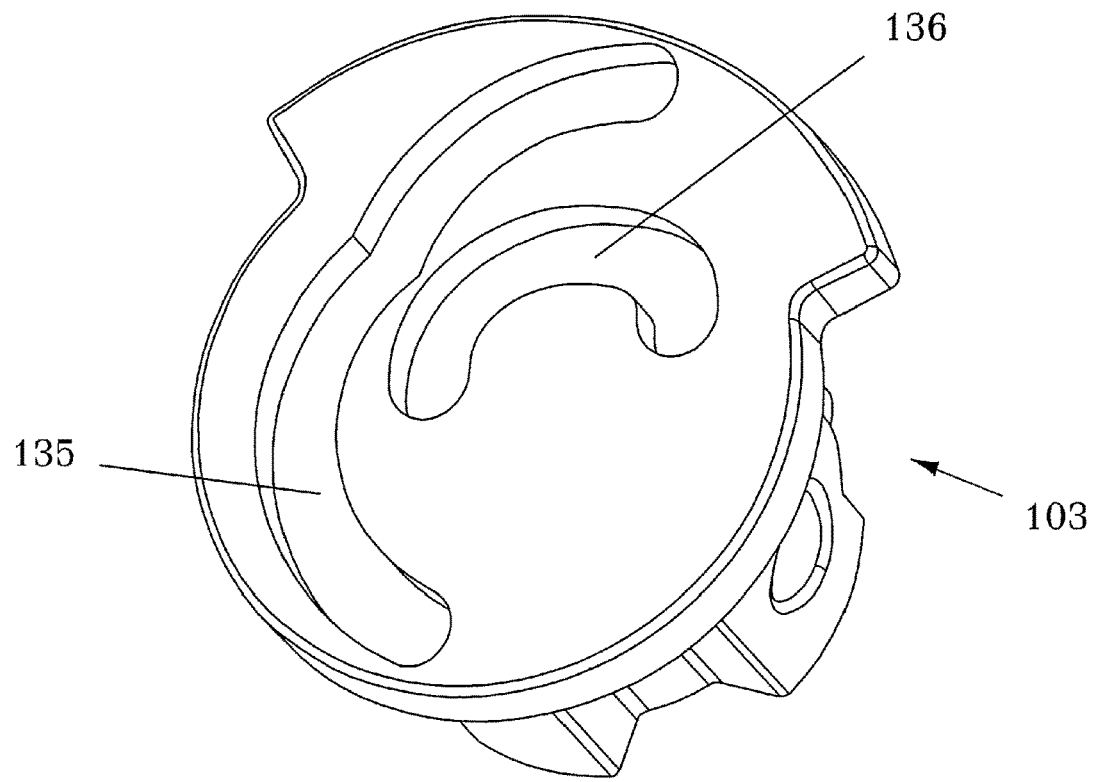
FIG. 6 is an axonometric view from below, showing a different embodiment of the rod support, for producing a progressive-operation mixing cartridge.
Figure 7:
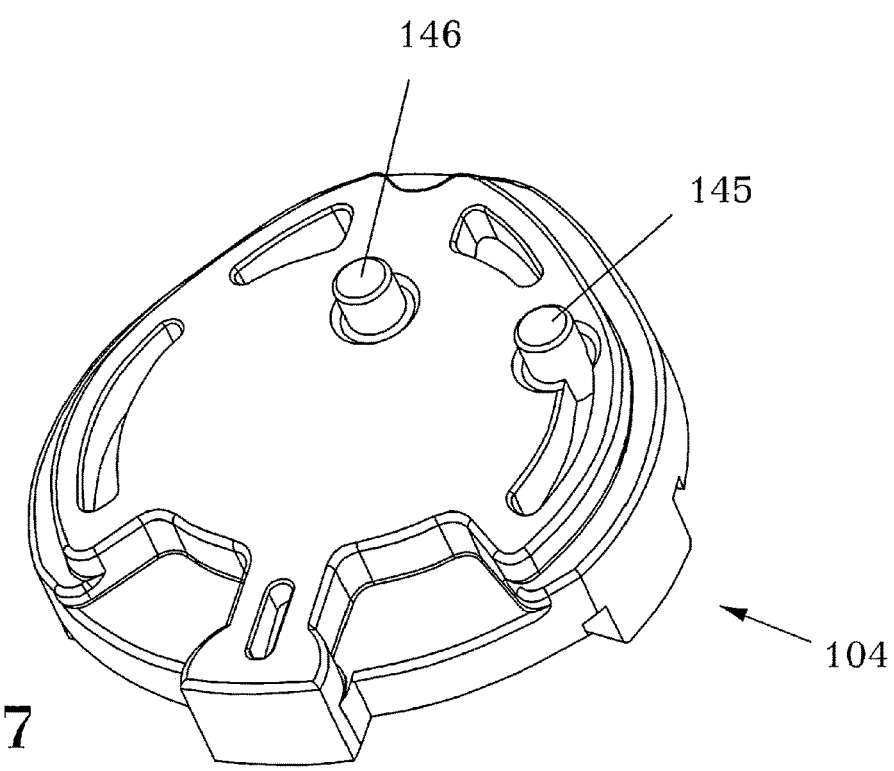
FIG. 7 is an axonometric view showing a different embodiment of the dragging device for the progressive-operation mixing cartridge.

An example of these variants is shown in FIGS. 6 and 7 which respectively show a variant of the rod (support), indicated by reference numeral 103, and of the dragging device, indicated by reference numeral 104.

Similarly to the description of the mechanism of the new deviator, the pegs 145 and 146 of the dragging device 104 engage in the flutes 135 and 136 of the rod support 103, thus being constrained to follow the profile of said flutes and therefore to perform the necessary movement for this cartridge.

This movement can also be achieved in a different way, mirror-like for example, so as to obtain opening in the anticlockwise direction instead of the clockwise direction.

In this implementation of a progressive cartridge, the water flow is identical to that of a traditional mixing cartridge, the hot and cold water entering the cartridge through inlets 138 and 139, rising up to the cavity formed in the moving plate 9 and descending again, mixed or not, to the aperture 133 of the seal 13 on the tap bottom.

According to the present invention, the movable disc of the progressive cartridge has a totally different movement from the normally rotary motion usually employed for these applications.

With this new kinematic mechanism, the rotary movement of the rod 22 is approximately 180° to allow better sensitivity and, at the same time, to reduce the operating force.

In practice, it has been observed that the invention achieves the intended aim and objects, both for a deviator and for a progressive mixing cartridge.

The control rod of this deviator has at least two supply positions in which the water flow is directed to one or another of two or more separate lines corresponding to two or more separate users; the rod moves in the support according to a fixed rotary type of path and also comprises a central closing position.

A rotary-movement deviator device equipped with closing derived from a traditional mixing cartridge or joystick has in fact been achieved, which is however substantially modified so as to achieve savings in parts and assembly equipment.

A progressive mixing cartridge has also been achieved, with movement of the plate 9 defined by a different path of the pegs in the slots, also derived from a traditional mixing cartridge and joystick.

One noteworthy characteristic of both aspects of the invention is constituted by the fact that the movement of the plate 9 is obtained by fixed paths of pegs in slots, which movement is different according to the shape of the slots.

Naturally, the materials used, as well as the dimensions, can vary according to needs.

The invention claimed is:

1. A deviator device comprising a mixing cartridge (100) and a control (2) applied to said mixing cartridge (100), particularly for bathroom fittings, said mixing cartridge (100) comprising:
   a first hole (133) for a flow of water;
   a pair of second holes (138, 139) for flow of water;
   a rotatably moving plate (9) for directing water between said first hole (133) and said pair of second holes (138, 139);
said control (2) comprising:
   a rotatable control rod (22) in integrally connected with a rod support (3);
   a dragging device (4) fixed to said moving plate (9) of said mixing cartridge (100), and
   a cover (5);
   said rod support (3) being arranged between said dragging device (4) and said cover (5);
   said control rod (22) having at least two supply positions in which a water flow is directed between one or another of said first hole (133) and said second holes (138, 139) of said mixing cartridge (100);
   said rod (22) being rotatably arranged in said cover (5) and further comprising a central closing position;
   said rod support (3) comprising a pair of slots (35, 36);

said dragging device (4) comprising a pair of pegs (45, 46) slidably arranged in said pair of slots (35, 36) of said rod support (3) such that a movement of said deviator device being driven and obtained by fixed paths of said pair of pegs (45, 46) within said pair of slots (35, 36) arranged between said rod support (3) and said dragging device (4).

2. A deviator device, according to claim 1, wherein said dragging device (4) is applied to said moving plate (9) of a cartridge body of said mixing cartridge (100) into which water inflows from said first hole (133) of a seal (13) on a bottom of said mixing cartridge (100), and the water flows through a container (12) of the mixing cartridge (100), and through a hole (111) of an inner seal (11), and through a hole (110) of a fixed plate (10), and outflows, through the moving plate (9), according to a selection, from one of two slots (108, 109) of the fixed plate (10), then returning to the bottom through one of said pair of second holes (138, 139) arranged on the seal (13).

3. A a deviator device, according to claim 1, wherein said dragging device (104) is applied to said moving plate (9) of a cartridge body of said mixing cartridge (100) with opening/closing carried out only by a rotary motion.

4. A deviator device, according to claim 1, wherein said dragging device (104) is fixed to said moving plate (9) of a cartridge body of said mixing cartridge (100) into which hot and cold water inflows through said pair of second holes (138, 139) of an external seal (13) on a bottom of said mixing cartridge (100), and the water flows through a container (12) of the mixing cartridge (100), through two slots of an inner seal (11), through two slots (108 and 109) of a fixed plate (10) of the cartridge body of said mixing cartridge (100) and outflows, through a cavity of the moving plate (9), and through a hole (110) of the fixed plate (10) to return to the bottom through a hole (111) of the inner seal (11) and through the container (12) and through a hole (133) of the external seal (13).

5. A deviator device, according to claim 1, wherein said dragging device (4) further comprises a projection (47) slidable in a groove (57) of the cover (5), said pair of pegs (45, 46) of said dragging device (4) being constrained to move respectively in said pair of slots (35, 36) of the rod support (3), according to predetermined paths.

6. A deviator device, according to claim 5, wherein said rod support (3) further comprises a third peg (34) which is free to move along a slot (44) of said dragging device (4).

7. A deviator device, according to claim 6, wherein said dragging device (4) comprises at least one fixing projection (48) for integrally fixing said dragging device (4) to said moving plate (9) of said cartridge (100).

8. A deviator device, according to claim 7, wherein said rod support (3), through a pin (32), is connected to said control rod (22) and is equipped with at least one elastic tongue (33), that engages at least one first groove (53) formed in the cover (5) and, a bending of said elastic tongue (33) during rotation produces a snap so as to signal the central closing position.

9. A deviator device, according to claim 8, further comprising a second groove (54) in said cover (5) adapted to signal a condition of reduced supply to a user.

\* \* \* \* \*